United States Patent
Sarna

(10) Patent No.: US 10,346,942 B2
(45) Date of Patent: Jul. 9, 2019

(54) METHOD FOR EVENT DETECTION IN REAL-TIME GRAPHIC APPLICATIONS

(71) Applicant: Electronic Arts Inc., Redwood City, CA (US)

(72) Inventor: Yuval Sarna, Qiryat Tivon (IL)

(73) Assignee: Electronic Arts Inc., Redwood City, CA (US)

( * ) Notice: Subject to any disclaimer, the term of this patent is extended or adjusted under 35 U.S.C. 154(b) by 643 days.

(21) Appl. No.: 14/611,834

(22) Filed: Feb. 2, 2015

(65) Prior Publication Data

US 2016/0225117 A1    Aug. 4, 2016

(51) Int. Cl.
| | |
|---|---|
| *H04N 21/478* | (2011.01) |
| *A63F 13/52* | (2014.01) |
| *G06T 1/20* | (2006.01) |
| *G06T 15/00* | (2011.01) |
| *H04N 21/234* | (2011.01) |
| *A63F 13/355* | (2014.01) |
| *A63F 13/53* | (2014.01) |
| *G06T 1/60* | (2006.01) |

(52) U.S. Cl.
CPC .............. *G06T 1/20* (2013.01); *A63F 13/355* (2014.09); *A63F 13/52* (2014.09); *A63F 13/53* (2014.09); *G06T 1/60* (2013.01); *G06T 15/005* (2013.01); *H04N 21/23418* (2013.01); *H04N 21/4781* (2013.01); *A63F 2300/203* (2013.01); *A63F 2300/209* (2013.01); *A63F 2300/6692* (2013.01)

(58) Field of Classification Search
None
See application file for complete search history.

(56) References Cited

U.S. PATENT DOCUMENTS

| | | | |
|---|---|---|---|
| 2004/0225986 A1* | 11/2004 | Lin | G06F 17/5068 716/122 |
| 2008/0207328 A1 | 8/2008 | Slough et al. | |
| 2012/0100915 A1 | 4/2012 | Margalit et al. | |
| 2014/0125669 A1* | 5/2014 | Kilgariff | G06T 15/80 345/426 |

FOREIGN PATENT DOCUMENTS

| | | |
|---|---|---|
| WO | WO-2009/026198 A1 | 2/2009 |
| WO | WO-2016/125004 A1 | 8/2016 |

OTHER PUBLICATIONS

European Search Report dated Jun. 9, 2016, for EP Application No. 16152105.9, twelve pages.

(Continued)

*Primary Examiner* — Kyle Zhai
(74) *Attorney, Agent, or Firm* — McDermott Will Emery LLP

(57) ABSTRACT

A computer implemented method for event detection in real-time graphic applications, comprising: receiving an indication for a method selected from a group of methods for identifying an action-requiring element comprised in a frame rendered during a game; activating the method for recognizing whether the element is comprised in a frame to be rendered; and responsive to the element being comprised in the frame, taking the action, wherein the method is a least resource-consuming or least intrusive method of the group of methods applicable for the frame.

9 Claims, 7 Drawing Sheets

(56) References Cited

OTHER PUBLICATIONS

Mazeroff, G. et al. (Aug. 23, 2007). "Probabilistic suffix models for API sequence analysis of Windows XP applications," ScienceDirect, Pattern Recognition. Elsevier, GB, vol. 41, No. I, located at: http://www.sciencedirect.com>, pp. 90-101.

Peleg, H. et al. (Jun. 20, 2013). "Symbolic Automata for Static Specification Mining," Static Analysis, Springer Berlin Heidelberg, Berlin, Heidelberg, pp. 63-83.

* cited by examiner

METHOD FOR EVENT DETECTION IN REAL-TIME GRAPHIC APPLICATIONS

TECHNICAL FIELD

The present disclosure relates to real-time 3D applications in general, and to a method and apparatus for detecting events when converting applications from one computing platform to another, in particular.

BACKGROUND

The cost of developing computer games is very high, and may involve costs relates to developing the plot, the logic and the graphics, programming, marketing and other related costs.

Therefore once a computer game is developed for one platform, such as a standalone play station, the owner may wish to make further uses of the game, for example deploy it on further platforms.

Significant parts of the computer code of a game, such as the logic of the game can be used as is, or may be ported to another platform manually or by using automatic porting tools. Other parts, such as graphic libraries may be ported by using compatible existing tools, and modules that communicate with such libraries may be ported or may initially be written to correspond to multiple such libraries.

However, some features of the original platform cannot exist on the new platform, such as usage of certain user controls. Further, some options may not be enabled or supported when the game is to be used on the new platform. Therefore, presenting instructions to a user to use non-existent controls, or attempt by the user to activate non-supported options presented to him may lead to frustration of the user, malfunction or crash of the game, or other undesirable situations.

It is thus required to identify graphic elements such as symbols, text or other graphic elements associated with such controls or options, and to take preventive actions such as hiding the graphic element, displaying another element on top of it, presenting a text stating that the options is unavailable, blocking an action, simulating a mouse click, or the like. However, identifying such graphic elements in an automatic manner within a frame is not always an easy task. The location, color, size, font or other characteristic of the element may vary between different circumstances or even continuously while the element is displayed. The surrounding of the element, which may be required to identify it may also change. Additionally, multiple instances of the same graphic element may be displayed in one frame. For example, the symbol "O" may be used for instructing a user to use a specific control, but the same symbol may be used as a regular "O" letter appearing in additional text blocks within the same frame, in which they should not be hidden and for which no action has to be taken.

BRIEF SUMMARY

One exemplary embodiment of the disclosed subject matter is a computer-implemented method performed by a computerized device, comprising: receiving an indication for an identification method selected from a group of identification methods for identifying an action-requiring element comprised in a frame rendered during a game; activating the identification method for recognizing whether the element is comprised in a frame to be rendered; and responsive to the element being comprised in the frame, taking the action, wherein the identification method is a least resource-consuming or least intrusive method of the group of identification methods applicable for the frame. Within the method, the group of identification methods optionally comprises: pattern matching, per-pixel pattern matching, API sequence identifying; and using a modified version of a function executed by a graphic processor pipeline. Within the method, the action is optionally selected from the group consisting of: adding a second element for hiding the element; and adding a second element.

Another exemplary embodiment of the disclosed subject matter is a computer-implemented method performed by a computerized device, comprising: receiving a modified version of a function being called during a rendering pipeline of a graphic processor when rendering a frame, wherein the function determines whether input provided to the function complies with constraints provided to the function; activating the modified version of the function; and taking an action if output of the modified version of the function indicates that input and constraints provided to the modified version of the function match. Within the method, the function is optionally adapted to indicate in the function's output whether the input provided to the function complies with the provided constraints. Within the method, responsive to matching of the input and constraints, output of the modified version of the function optionally comprises a dummy element. The method may further comprise: issuing a query related to the number of elements output by the modified version of the function; and taking the action responsive to the query response being that the number of elements output by the modified version of the function exceeds the number of elements input into the modified version of the function. The method may further comprise adding a deferred state to an automaton representing a series of calls leading to calling the modified version of the function, wherein the automaton assumes the deferred state until the query response is received. The method may further comprise generating a copy of an automaton representing a series of calls leading to calling the modified version of the function, responsive to a further instance of the series of calls occurring within the frame. The method may further comprise keeping a first automaton buffer for a first frame and a second automaton buffer for a second frame; and swapping the first and the second buffers when a third frame is to be handled. Within the method, the method is optionally activated only in response to identifying that a corresponding indication is associated with the frame. Within the method, the action is optionally selected from the group consisting of: adding a second element for hiding the element; and adding a second element.

Another exemplary embodiment of the disclosed subject matter is a computer-implemented method performed by a computerized device, comprising: receiving a representation of a pattern, each entry in the representation associated with a value and with at least one distance threshold; receiving a part of a frame, in which each pixel is associated with a pixel value; and responsive to the pixel value of each pixel of the part of the frame being within the corresponding distance threshold from the value of the corresponding entry of the matrix for at least a predetermined part of pixels, taking an action. Within the method, the method is optionally activated only in response to identifying that an indication to the method is associated with the frame. Within the method, the action is optionally selected from the group consisting of: adding a second element for hiding the element; and adding a second element. Within the method, the distance threshold is optionally determined as a maximal distance between a pixel value in the pattern and values of corresponding pixels in multiple frames. The method may further comprise filtering the distance threshold.

Yet another exemplary embodiment of the disclosed subject matter is a computer program product comprising: a non-transitory computer readable medium; a first program instruction comprising: a second program instruction for receiving a matrix representing a pattern, each entry of the matrix associated with a value and with a threshold distance; a third program instruction for receiving a part of a frame, comprising a pixel value for each pixel; and a fourth program instruction for taking an action, responsive to the pixel value of each pixel of the part of the frame being within the corresponding threshold distance from the value of the corresponding entry of the matrix; and a fifth program instruction comprising: a sixth program instruction for receiving a modified version of a function being called during a rendering pipeline of a graphic processor, wherein the function determines whether input provided to the function complies with constraints provided to the function; a seventh program instruction for activating the modified version of the function; and an eighth program instruction for taking an action if output of the modified version of the function indicates that input and constraints provided to the modified version of the function match, wherein said first, second, third, fourth, fifth, sixth, seventh and eighth program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
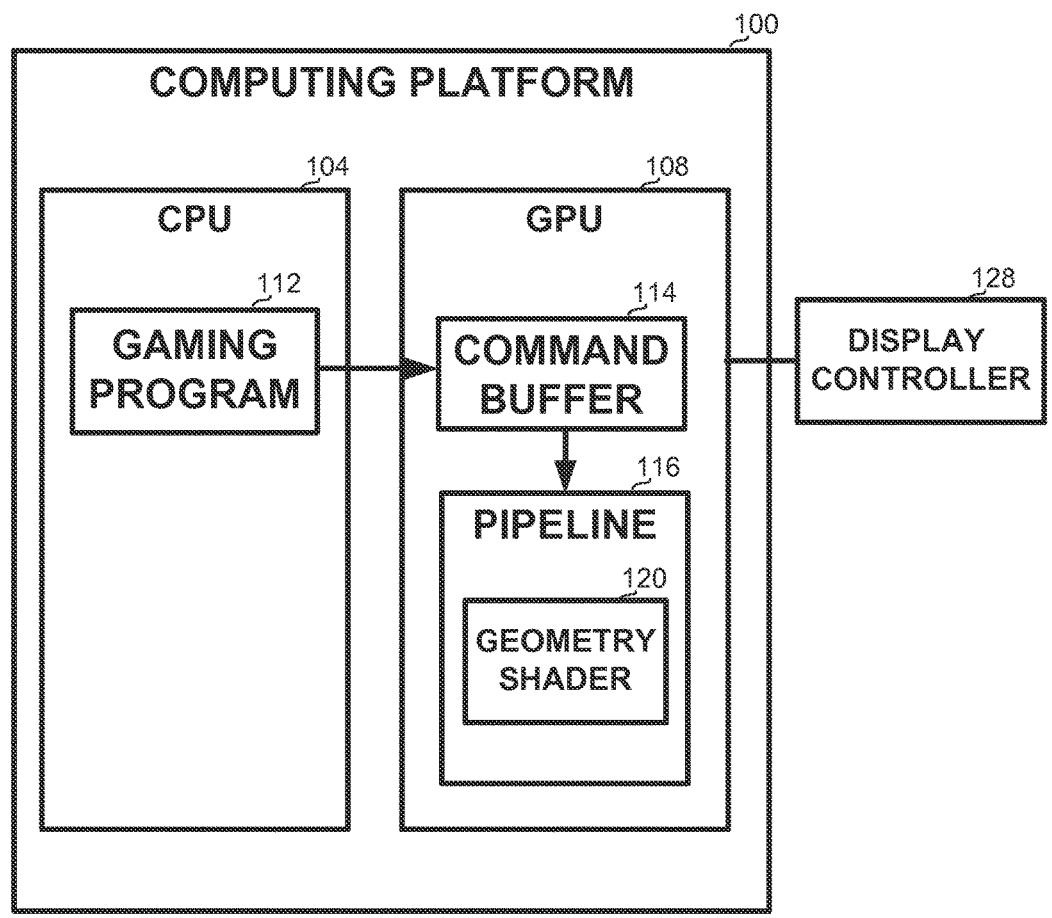
FIG. 1 shows a schematic block diagram of processing entities in a graphic-enabled system, in accordance with some exemplary embodiments of the disclosed subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is the need to recognize certain graphic elements, such as letters, words, symbols, icons or others (hereinafter "elements") in displayed frames as part of real-time graphic applications, and in particular real-time three dimensional applications, such as gaming applications. Although the disclosure below concentrates on gamin applications, it will be appreciated that the disclosure is not limited to such applications, and may be applied to any real-time graphic application. Some of these elements, when displayed, represent options, instructions or other elements which are not supported by the current configuration and therefore require an action to be taken. An action may be displaying a different or an additional graphic element that hides the first element, displaying a message that an option is not supported, blocking an action, or the like, depending on the application, the platform, or other factors. It will be appreciated that the action to be taken is not limited to graphics, rather any action may be taken, such as hiding a mouse cursor, simulating a button push, or any other action, whether the action relates to the application or not.

However, the graphic elements may be displayed with a multiplicity of characteristics, such as size, location, font, color, or others, which may be applied to the element itself or to its surrounding. Even further, displaying the element may require an action in some circumstances or locations and not require any action in others.

The difficulty in recognizing the elements may vary, depending on the specific frame and preceding and following frames, the stage of the game, the platform, or other factors. For example, elements displayed in known locations, size, font and other characteristics in frames which are part of a static frame sequence may be easy to recognize, while elements in more complex situations are harder to identify.

Another technical problem is the need to identify such elements with high speed and efficiency so as not to slow down the application.

While some of the methods traditionally used for identifying such elements require the comparison of memory locations such as buffers, new graphical Application Program Interfaces (APIs) strictly limit the accessibility of such buffers, thus presenting another technical problem by disabling some of the methods.

One technical solution of the subject matter relates to using a gradual approach, in which less resource-consuming or less intrusive methods are used whenever possible, for example in static frames or when the element is of a known appearance and in a known location, and increasingly more resource-consuming or more intrusive methods are used in situations where simpler methods are insufficient.

Another technical solution relates to attempting to use a simple pattern matching when possible, in which a known pattern, which may comprise information related to shape, size or color of a symbol is searched in the frame at a specific location.

Another technical solution relates to using a per-pixel pattern matching approach in more complex cases, e.g., when the background of an element varies dynamically. In the per-pixel pattern matching approach, a variance threshold is assigned to each pixel in the pattern, wherein the threshold indicates the allowed level of variance in the pixel. Pixels assigned low threshold are more significant pixels in which only a small variance is allowed in the YUV (color coding) of the pixel relative to the value of the pixel in the given pattern, indicating that the pixel is part of the element. Pixels with higher threshold are less significant pixels in which a larger variance is allowed in the YUV, and pixels with further higher threshold are even less significant, indicating that the pixel may not be part of the element but may belong to the background.

In further complex cases, yet another technical solution is provided, referred to as API approach, which relates to a method that utilizes an API sequence. An API sequence may be implemented as Final State Automaton (FSA) in which each state represents a function call, wherein each element may include the name of the function and the parameters passed to the function. The FSA may comprise one or more accepting states in which the last call contains an element for which an action is to be taken. If during a game a sequence of graphic calls is issued, each having the same parameters as in the FSA, the FSA may advance one state per each call. The FSA may comprise one or more accepting states which indicate that the frame comprises an element for which an action is required.

In some cases, for example in instanced rendering call in which multiple instances of the element are rendered by the same call, reaching an accepting state in the API Sequence may not be sufficient, and a bit-by-bit comparison of the call's data buffers may be required.

However, bit-to-bit comparison may be highly inefficient, and since real-time 3D applications are generally computation-intensive and highly resource consuming, the application may be thus slowed down. Moreover, bit-to-bit comparison may be impractical since recent versions of some common graphical APIs enforce strict rules of whether a specific buffer has Central Processing Unit (CPU) or Graphical Processing Unit (GPU) read or write accesses, thus making such comparison impractical. Since most games use dynamic buffers, i.e., buffers without CPU read access, it is practically impossible to compare the data bit-by-bit, since the data must be copied to the system's RAM every time it is changed.

Thus, in yet another technical solution, instead of bit-by-bit comparison, a GPU approach is provided, for detecting the presence of action-requiring elements in complex scenes. The detection is made entirely on the GPU and on-the-fly without buffer inspection, thus saving a lot of copying and processing time.

The GPU approach utilizes the pipeline in graphical APIs which enables a developer to modify some functions in the API, and in particular the geometry shader (GS).

A preparation stage, also referred to as investigation stage may be performed, which may produce data to be used by either the API approach or the GPU approach.

On the preparation stage, the game may be run in debug mode, and the calls to drawing the relevant elements may be identified. An XML configuration file may then be created, which specifies the input to these calls, including the specific parameters related to the action-requiring element. In some embodiments, an API sequence automaton may also be created, which comprises the API call signatures.

In run time, both the API approach and the GPU approach use the data created on the preparation stage. However, the GPU approach does not require the automaton but merely the function information.

When the GPU approach is taken, a modified GS is activated instead of the default one. The situation of calling the geometry shader for instanced call is discussed further below. The modified GS then checks the parameters it received and compares them to the parameters appearing in the XML file, which may be also supplied to the GS. If there is a match, i.e., the rendered element is the one for which the action is required, the GS adds a "dummy" primitive to the output stream. The number of primitives output by the GS is checked by issuing a query to the GPU. If the number of primitives is as expected, then no dummy element was added and no element that requires an action has been identified. If the number of primitives is larger than expected, then a dummy element has been added, an action-requiring element has been identified, and an action may be taken.

One technical effect of the disclosure relates to identifying elements that require an action while optimizing resource consumption, by using increasingly resource-consuming or increasingly intrusive methods as required.

Another technical effect of the disclosure relates to improving the pattern matching technique by assigning a threshold to each pixel rather than a general threshold, the threshold indicating the significance of the pixel to the identification of the element.

Yet another technical effect of the disclosure relates to utilizing the GPU for determining whether an element that requires a specific action is rendered.

Referring now to FIG. 1, showing a simplified environment of a gaming platform, which uses some embodiments of the disclosure.

Gaming platform 100 comprises a CPU 104 which may execute computer instructions of one or more programs loaded to a memory device associated with the CPU. It will be appreciated that CPU 104 may comprise one or more processors in any required architecture and communication methodologies therebetween. The processors may be collocated on the same device or one or more of them may be remotely located.

Gaming platform 100 also comprises a GPU 108 which may also execute computer instructions of one or more programs loaded to a memory device associated with the GPU. In particular GPU 108 may be particularly adapted to perform graphical programs and computations in specialized and efficient manner. GPU 108 may comply with an Application Program Interface (API) comprising one or more commands which can be called from programs executed by the GPU or by other processors such as CPU 104.

In some embodiments, GPU 108 may comprise a command buffer 114 into which one or more applications, such as one or more gaming applications executed by CPU 104, enter commands.

Pipeline 116 may retrieve commands from command buffer 114 and execute them. In some embodiments, some of the GPU functionality, for example geometry shader stage 120 which is part of pipeline 116 may be modified by a developer, and at the correct circumstances the modified geometry shader function may be called rather than the original one. The specific GS to be used when executing a particular command may be indicated as a parameter of the command as stored in the command buffer.

GPU 108 may also comprise query handler for receiving one or more queries from programs executed by GPU 108 or by other processors such as CPU 104, and providing responses. In some embodiments, the query handler may be accessed through the API as well. In some embodiments, the query may be issued as a command stored in the command buffer and may be executed by pipeline 116 as any other command. The queries may relate to the states or actions of GPU 108, for example querying how many primitives geometry shader function 120 has output.

When pipeline 116 is done, it may send one or more rendering commands to the relevant display controller 124, whether display controller 124 is executed on the same computing platform or a remote one, as is the case with cloud gaming in which all logic and computations are performed at a remote location and the frames are transmitted to the user's platform, such as set top box for display.

CPU 104 may execute one or more programs, such as a gaming program 112 comprising logic, graphic and additional commands. Some commands, for example commands related to the logic of the game are performed by CPU 104. However, other commands and in particular graphic-related commands may be performed by placing commands, including drawing commands, queries, or the like in command buffer 114, wherein the commands comply with the interface of GPU 108.

Figure 2:
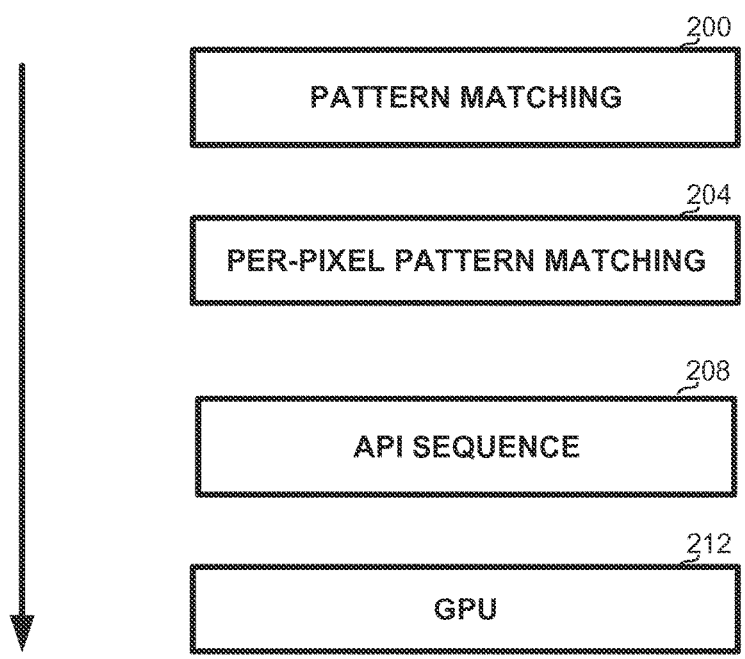
FIG. 2 shows a sequence of methods for identifying an action-requiring element in a frame, in accordance with some exemplary embodiments of the disclosed subject matter.

Referring now to FIG. 2, showing a series of methods which may be used for detecting within a frame an element that requires a specific action. The method to be applied for each frame may be selected by a user, such as a game developer, a person porting an existing game to a different platform, or the like. The method may be selected per scene and not necessarily per each frame. A user may generally attempt to apply the least resource-consuming or the least intrusive method applicable for each frame or scene, depending for example on whether the pattern is displayed at a fixed location or at varying locations; whether the pattern is of constant colors or its colors vary; whether the background of the pattern is fixed or changing; whether there are multiple instances of the pattern in the frame; or other factors.

The method to be applied may be indicated as part of each frame, on certain frames and used for further frames until an indication for a different method is received, as part of a scene, or the like.

At the easier cases, for example when the pattern is displayed at a fixed location, with fixed colors and fixed backgrounds, a simple pattern matching algorithm 200 may be performed, which may search for a known pattern within a frame. The pattern may be expressed in YUV format and may be associated with X and Y offsets and X and Y sizes.

In each rendered frame, it may be attempted to match the defined rectangle to the pattern, using a global threshold. During matching, the YUV format of each pixel is compared against the YUV of the corresponding pixel in the pattern. If the difference is below the global threshold for all, or substantially all pixels, it is determined that the pattern was found.

On more complex cases, a per-pixel pattern matching method 204 may be performed, which is further detailed in association with FIGS. 3A and 3B below.

On further complex cases, an API sequence method 208 may be selected, possibly in combination with buffer data comparison. An API Sequence is an FSA in which each state represents a function call, wherein each element may include the signature of the function, comprising its name and the passed parameters. The FSA may comprise one or more accepting states in which the last call contains an element for which an action is to be taken. If during a game, a sequence of graphic calls is issued, each with parameters corresponding to those in the FSA, the FSA may advance one state per each call. One or more such states may be accepting states.

On the most complex cases, a GPU method 212 may be used, as detailed in association with FIGS. 4, 5 and 6 below.

After assigning an indication to a method for identifying the pattern to each frame, in runtime the system may be adapted to receive the indication for identifying an action-requiring element comprised in a frame rendered during a game, activate the method for recognizing whether the element is comprised in a frame to be rendered, and taking the action responsive to the element being comprised in the frame, wherein the method is selected to be a least resource-consuming or least intrusive method applicable for the frame.

Figure 3A:
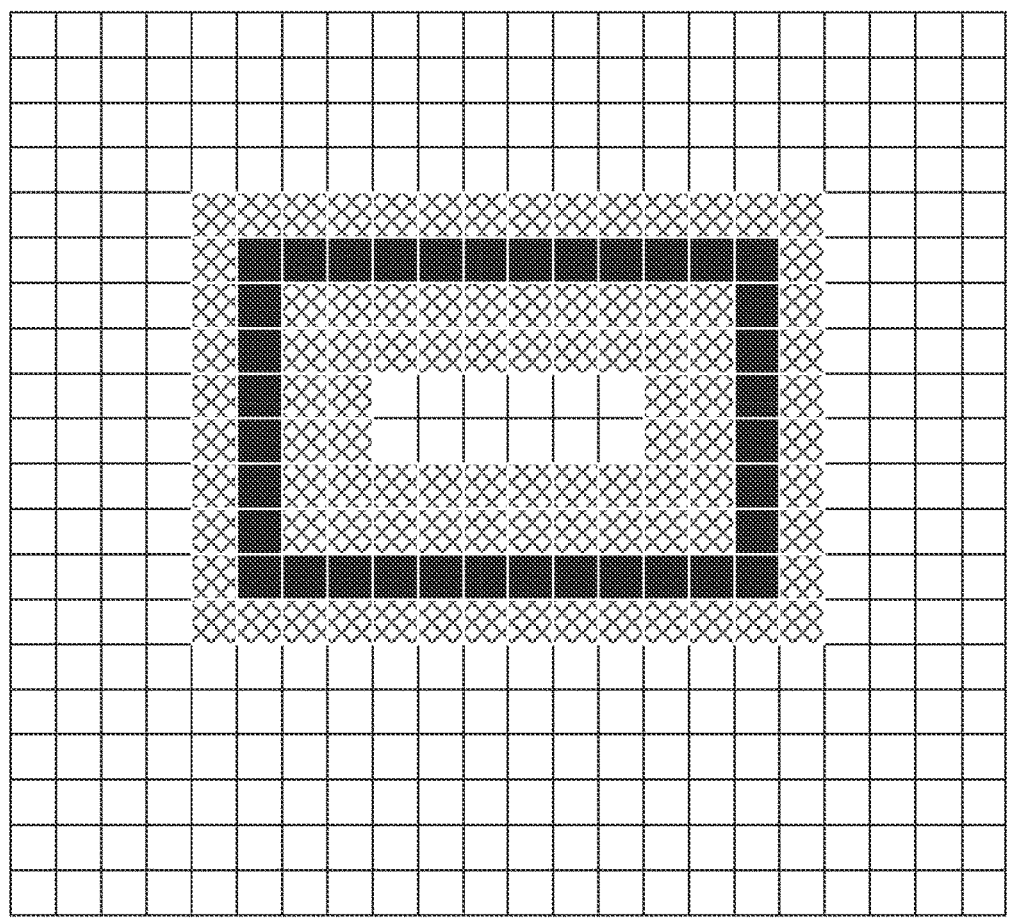
FIG. 3A shows an illustration of pattern and its surrounding pixels, in accordance with some exemplary embodiments of the disclosed subject matter.

Referring now to FIG. 3A, displaying a graphic element to be identified. Each square in FIG. 3A represents a particular pixel, and the graphic element for which an action is required consists of the black squares.

In accordance with some embodiments of the method, the pixels represented by the black squares are assigned the lowest variance threshold, indicating that only small deviation from the color of the original pattern is accepted in the appearance of these pixels in different instances or different frames.

The pixels represented by checked squares may be assigned a higher variance threshold, since a larger degree of flexibility is allowed in the environment of the element.

The pixels represented by the white squares may be assigned an infinite threshold since belong to the background and may be irrelevant to identifying the element.

In this method, matching may be performed in the same manner as in the simple pattern matching, by determining for each pixel in the pattern whether its value is within a variance threshold from the corresponding pixel in the original pattern. However, the threshold may be different for different pixels.

Each of pattern matching and per-pixel pattern matching options 200 and 204 of FIG. 2 may be performed on the CPU of the computing platform by storing the extracted patterns on the system's Random Access Memory (RAM), copying the rendered frame output to the system's RAM, and performing the described comparison using the CPU.

It will be appreciated that the disclosure is applicable to any type of memory device, including but not limited to a hard disk, a flash, am EPROM device, or any other local or remote memory device.

However, performing these methods on the CPU is extremely inefficient since it incurs high overhead for copying rendered frames to the system's RAM. Performing these algorithms or parts thereof on the GPU as described following the description of FIG. 5 below, may increase their efficiency.

Figure 3B:
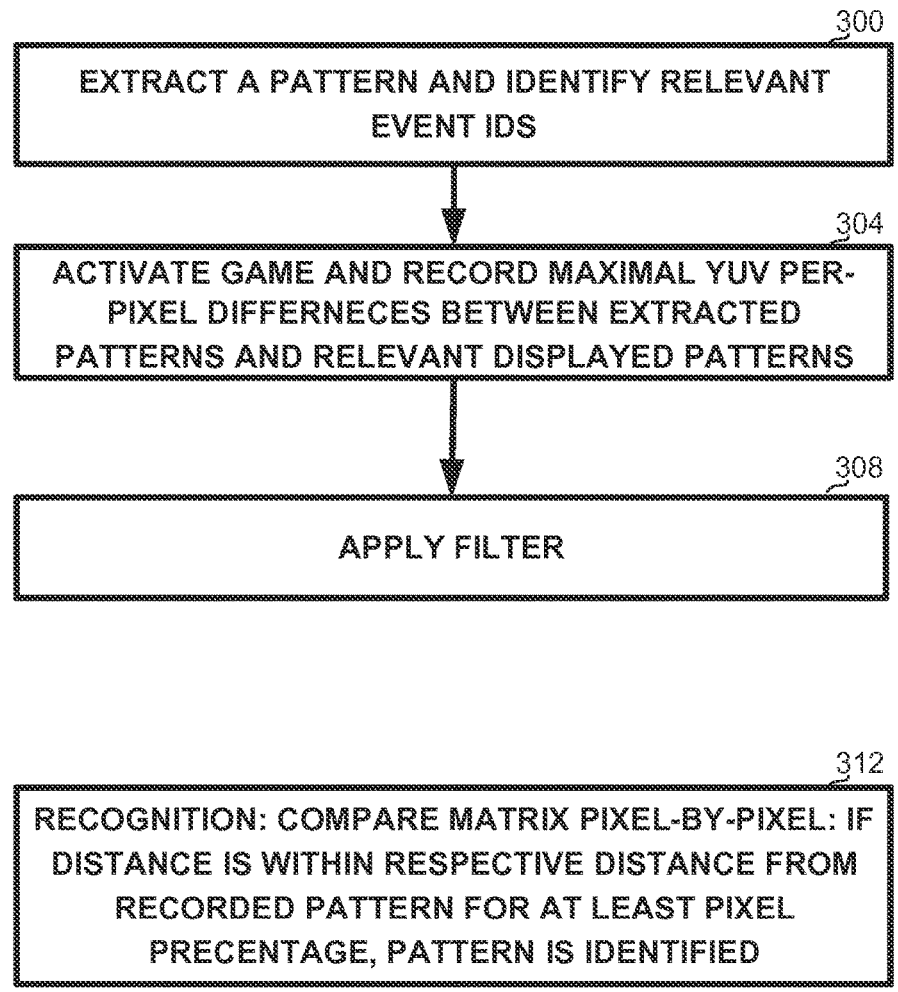
FIG. 3B shows an illustration of a method for generating and using a distance threshold matrix for a pattern, in accordance with some exemplary embodiments of the disclosed subject matter.

Referring now to FIG. 3B, showing a flowchart of steps in a method for determining and using the per-pixel threshold.

The thresholds may be represented in a matrix having any required format for comparing YUV values, for example PNG format.

The per-pixel threshold matrix may be created by a learning process on a per-pattern basis as described below in association with steps 300, 304 and 308.

On step 300 a pattern is extracted from the game and recorded, and an event ID is recognized which relates to an event it is required to fire when the pattern is identified. It will be appreciated that the same event ID may be associated and the same event may be fired with other patterns as well.

On step 304 the game is activated in development mode, and whenever the pattern is displayed such that the required event has to be fired, the maximal per-pixel distance between the value in the pattern to be identified and the pattern as rendered is recorded. The distance can be expressed as one value per pixel, for example the maximal value between the three respective distances related to the YUV components. Alternatively, the distance may be expressed as three numerical values, each related to one YUV component. In yet another alternative, the distance may be expressed as six numerical values: two values per each component, one indicating the maximal distance recorded above the component value in the pixel, and the other indicating the maximal distance recorded below the component value in the pixel.

After one or more times when the pattern is detected in situations requiring the event and the maximal distances are recorded, a variance matrix may be created, in which each entry represents the maximum allowed distance between the values in the pattern as initially extracted and the pixel values present in the rendered frame.

On step 308, a filtering process is activated upon the distance matrix. The filtering process comprises enhancing the values in the differences matrix to better define and separate between pixels upon their relevancy to the pattern.

A pattern may be considered "good" if it has maximal probability of being activated when required, i.e., true positive, and minimal probability of being activated when it should not, i.e., false positive.

A pixel percentage refers to the percentage of pixels from the pattern (width*height) that is required to pass the filtering process in order for the pattern to be considered a "good" pattern.

A harsh threshold refers to a value, for example in the range of 0.0-1.0, that specifies a threshold for pixel value distance. A pixel is considered a very good pixel if the range of the values associated with this pixel in the matrix is below the harsh threshold, for example 0.04.

A minimal threshold also refers to a value that specifies a threshold for pixels variance, for example in the range of 0.0-1.0. A pixel is considered "decent" if the range of the values associated with this pixel is above the harsh threshold and below the minimal threshold.

It will be appreciated that the harsh threshold is lower than the minimal threshold, since a "very good" pixel is likely to vary less than a "decent" pixel.

Harsh threshold addition and minimal threshold addition are two values, for example in the range of 0-1 that may be added to the matrix values as follows:

If the range indicated in the matrix for a pixel is below the harsh threshold, i.e., it is a very good pixel, then the harsh threshold addition is added to the value.

If the range is above the harsh threshold but below the minimal threshold, then a number larger than the harsh threshold addition is added to the value, for example twice the harsh threshold addition.

If the range is above the minimal threshold, i.e., it is a pixel with high variance, then the minimal threshold addition is added to the value. A pixel for which the distance is above the minimal threshold is generally an irrelevant pixel but ignoring it may lead to false positives, therefore the minimal threshold addition may be selected to be a large one to cover many cases but not too high so as not to cause false positives.

Adding the distances provides for better defining and separating between "very good" pixels which are likely not to change much, "decent" pixels which may change more and are more prone to false positive cases but are still relevant, and irrelevant pixels.

It will be appreciated that filtering step 308 is optional, and the method may also be applied with the distances as extracted during the game.

It will also be appreciated that the method is not limited to three degrees of pixel "quality" and any other number of degrees may also be used.

Recognition step 312 may be performed in runtime when the game is played, and when it is required to identify whether the pattern is present, such that the event may be fired or a corresponding action may be taken.

In runtime, the values of the pixels in the original pattern are received, as well as a corresponding distance value or values associated with each pixel.

The pattern is searched by comparing the pixel values of the original pattern with the rendered values at the expected location of the pattern. If for at least a pixel percentage, for example 80% of the pixels, the rendered value is within the corresponding distance from the value of the corresponding pixel of the original pattern, the pattern is identified, and the action may be taken.

It will be appreciated that this method may be applied when the location of the expected pattern is known, such that corresponding pixel values may be compared. However, the method may also be applied when the pattern is searched for in other locations in the frame.

Figure 4:
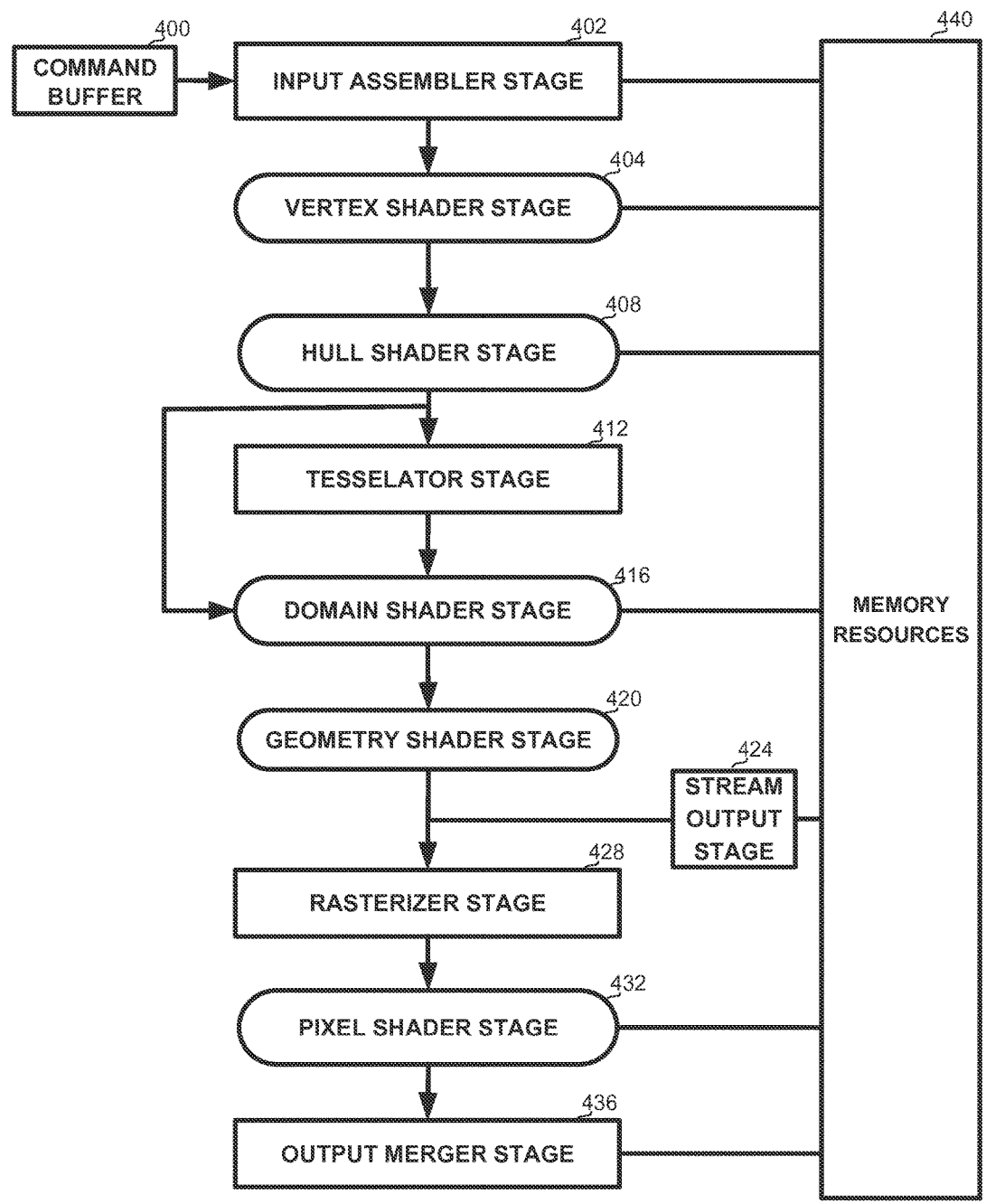
FIG. 4 shows a flowchart of steps in a method for graphic processing in accordance with some exemplary embodiments of the disclosed subject matter.

Referring now to FIG. 4, showing a schematic flowchart of a drawing pipeline as implemented in recent graphic environments, which may be used in accordance with some embodiments of the disclosure.

In previous methodologies, the rendering pipeline could have been fixed and a user could not affect any stage, or stop at any location during the process. Current methods provide a developer with the option to replace some of the stages with modified functions, and thus change their behavior, obtain intermediate results or otherwise affect the process. It will be appreciated that the modified versions may be used on some of the cases, wherein the original functions may be used in other cases. Even further, a multiplicity of modified versions may be provided by a user, and each may be used when appropriate.

The stages mentioned below or their names may differ between different APIs or GPU systems, however, the principles and usage of such systems are analogous.

The stages that may be replaced with user-provided functions are indicated by rounded corners, and include vertex shader (VS) stage 404, hull shader stage 408, domain shader stage 416, geometry shader (GS) stage 420, and pixel shader stage 432.

The other stages, including input assembler stage 402, tesselator stage 412, rasterizer stage 428 and output merger stage 436 are currently fixed and cannot be replaced by user-provided functions.

For example, using the replaceable stages, the GPU may append or remove vertices from the pipeline in GS stage 420 after going through VS stage 404.

GS stage 420 may be used for performing different tasks, such as accelerating algorithms for 3D mesh rendering. GS stage 420 may receive primitives, such as one triangle or squares, with or without adjacency data, as input rather than single vertices as in VS stage 404.

All stages except stages 412 and 428 may read from or write to memory resources 440. GS stage 420 may also output data using stream output (SO) stage 424. SO stage 424 allows the vertices to be returned to the system's RAM, for example for inspection, after going through GS stage 420.

It will be appreciated that different pipelines implemented in other systems or other versions, may also be used, as long as a user is provided with the option to replace one or more stages with a user-provided function.

Figures 5A, 5B:
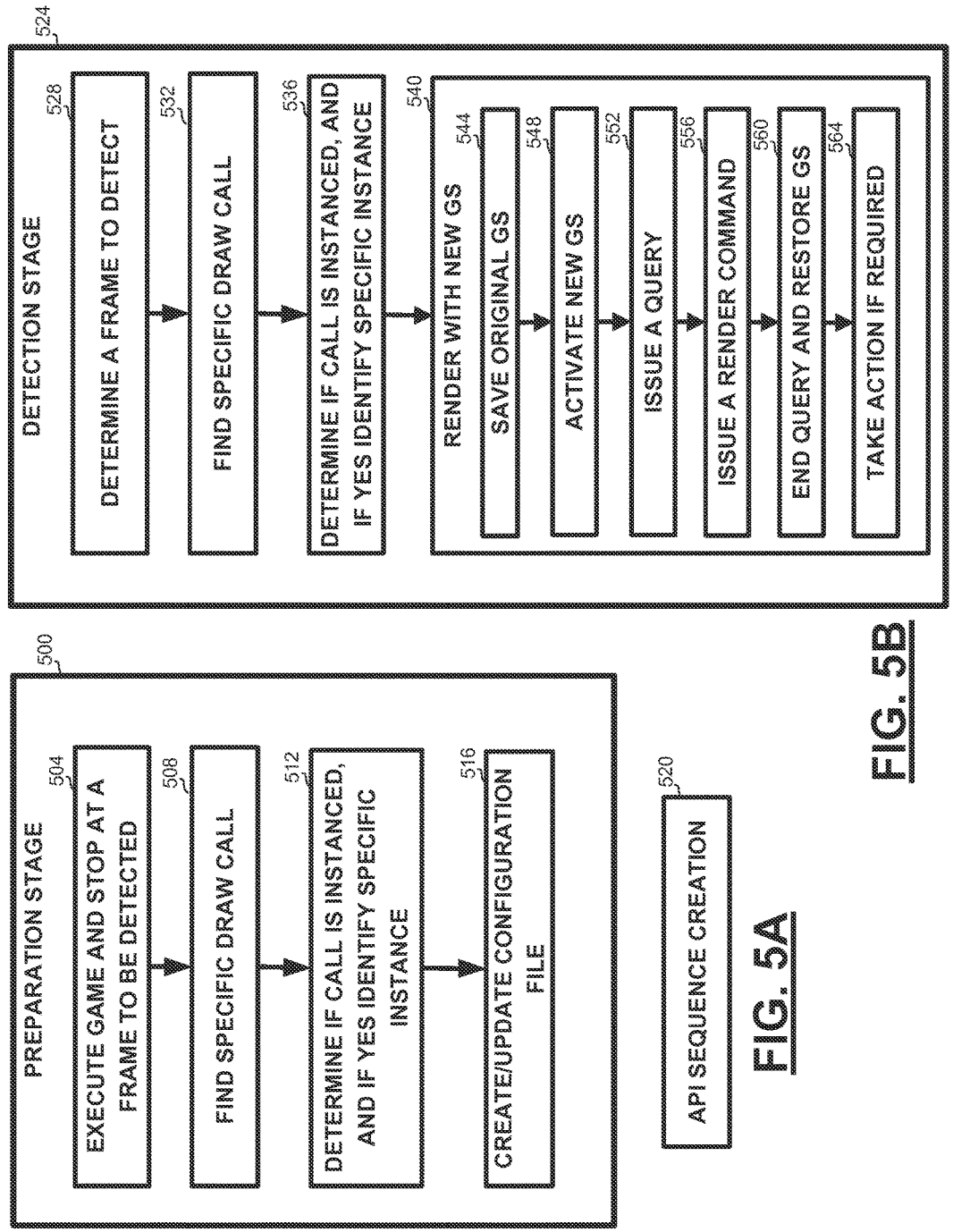
FIGS. 5A and 5B shows flowcharts of steps in a method for using the graphic processing of FIG. 4 for identifying an action-requiring element in a frame, in accordance with some exemplary embodiments of the disclosed subject matter.

Referring now to FIG. 5A, showing a flowchart of steps in a method for preparing a frame in which an element is to be detected using the GPU, as disclosed on option 212 of FIG. 2.

The method comprises preparation stage 500 followed by API sequence creation 520. Preparation stage 500 comprises steps 504, 508, 512 and 516. However, in some embodiments, API sequence creation 520 may also be implemented as part of preparation stage 500.

It will be appreciated that if the API method is to be used, then the preparation may relate only to the name of the called function and the parameters, while if the GPU method is to be used, additional parameters may be noted as well, such as color or position of the pattern.

Step 504 comprises executing the game in debug mode, such that the game may be stopped by a user. The game may be stopped when a frame containing an element which is to be detected by GPU option is displayed.

On step 508, the specific Draw call which renders the element to be recognized may be determined. The name and parameters of the calling functions may be noted. If the GPU method is to be used, additional parameters may also be noted as well, such as color or position of the pattern.

On step 512, it may be determined whether the Draw call is instanced in respect to the required element, i.e., whether it renders multiple instances of the element. If it is an instanced call, then the specific instance related to the element upon which the action is to be taken is identified, for example by noting its serial number, such as element 32 of 50. Whether the call is instanced may be determined by examining the input and output of VS stage 404, or by examining the name of the function call. In order to examine the input and output, a debugging tool may be used which presents the input and output. Alternatively, a proprietary version of VS stage 404 may be developed and used during preparation stage 500, which is possible since VS stage 404 may also be modified as disclosed in association with FIG. 4 above.

On step 516, if the GPU method is to be used, then a configuration file may be created or updated with information related to the specific output of VS stage 404, which is input to the GS stage 420. The file may comprise the specific values that differentiate the required element and the semantics to check, and Draw calls preceding the Draw call which renders the element to be recognized.

Table 1 below shows an exemplary embodiment of an entry of a configuration file, implemented as an XML file, which may be used if the GPU method is to be used.

TABLE 1

```
<?xml version="1.0"?>
-<GSDetections>
    <InputSignature PostVS="SV_POSITION,
        Texcoord0,Texcoord1,Texcoord2,Texcoord4,
        Texcoord6, Texcoord7" id="0"/>
    -<GeometryShaderDetection id="0" EntryFunctionName=
        "GS_Detection" SignatureID="0">
        <CheckValueLower id="0" w="1.0" z="0.0" y="0.85"
            x="1.0"/>
            <!--<CheckValueLower id="5" x="-1.4" y="-0.1"
                z="-100.0" w="-100.0" IsPosition="1" />
            <CheckValueUpper id="5" x="0.1" y="1.5" z="100.0"
                w="100.0" IsPosition="1" />-->
        <TexCoordIndices Params="2"/>
    </GeometryShaderDetection>
</GSDetections>
```

On step 520, an API sequence may be prepared and stored for optimization with repeating the process by adding prior Draw calls to the Draw call which renders the element to be recognized. The API sequence may relate to the current call, and may comprise an accepting state, i.e., a state for which the GS option is to be activated. If the draw call is instanced, and if the specific API used allows it, an API sequence along with buffer data may be used for detection. Otherwise, the GS Detection method may be used. The GS detection may also be used in case the Draw call isn't instanced, but cannot be detected uniquely in a scene using only an API Sequence.

State detection, e.g. determining whether the FSA should continue to the next step or it is in an accepting/deferred state, as demonstrated in Table 2 below may be done by intercepting all Draw calls and comparing their names and parameters with the data saved in the XML file of the API Sequence.

Table 2 below shows an exemplary embodiment of an entry of an API sequence file, implemented as an XML file.

TABLE 2

```
<?xml version="1.0"?>
-<D3DAPISequence DirectX="11">
    <D3DCommand Params="111  2  0  0  73"
    PrimitiveTopology="4"
        Command="DRAWINDEXEDINSTANCED" id="0"/>
    <D3DCommand Params="111  2  0  0  73"
    PrimitiveTopology="4"
        Command="DRAWINDEXEDINSTANCED" id="1"
        StateProperty="STAY"/>
    <D3DCommand Params="111  2  0  0  73"
    PrimitiveTopology="4"
        Command="DRAWINDEXEDINSTANCED" id="2"
        StateProperty="STAY"/>
    -<D3DCommand Params="111  2  0  0  73"
    PrimitiveTopology="4"
        Command="DRAWINDEXEDINSTANCED" id="3"
        StateProperty="STAY"> <GSDetection id="0"
```

TABLE 2-continued

```
        PrimitiveID="0" InstanceID="2"/>
    </D3DCommand>
</D3DAPISequence>
```

Referring now to FIG. 5B, showing detection stage 524 which may be the run-time implementation of GPU detection option 212 of FIG. 2, after preparation stage 500 and optionally API sequence creation step 520 have been completed. Detection stage 524 may be performed by the CPU or by another processing unit which may activate the GPU by adding commands to the GPU command buffer.

On step 528 a frame is detected, which may comprise an element for which an action is required, wherein the frame is to be handled using the GPU method.

On step 532, the Draw calls associated with the frame are intercepted.

Step 536 may be performed for each such Draw call and may determine whether the call is instanced. If the call is instanced and contains n instances, then handling may be split as follows: the instance requiring the action is identified, denoted for example by m. Then instances 1 . . . m−1 are rendered as usual, and similarly for m+1 . . . n.

The $m^{th}$ instance is handled on step group 540 comprising the following steps:

On step 544, the original GS stage may be stored, for example if it was used prior to the Draw call, such that it may later be restored.

On step 548, the modified GS is activated and a query command is issued. Then the instance is rendered by the modified GS receiving the primitives to be rendered from VS stage 404, and the values from the configuration file, which may be passed to the GS as parameters, or stored in a buffer.

The modified GS checks its input vs. the configuration parameters, and if there is a match the modified GS outputs a dummy primitive in addition to the other primitives which were received. It will be appreciated that the modified GS may, in addition, perform all other actions as the original GS.

On step 552, the CPU may issue a query to the GPU, for example by adding a query command to the GPU command buffer. The query may relate to the number of primitives outputted by the GS.

On step 556 the rendering command is added to the GPU command buffer. During rendering, the modified GS may determine whether the input from the VS matches the configuration data. If there is a match, then another primitive may be added to the stream output by the GS. In order not to hide other data of the frame, the newly added primitive may be identical to one of the existing primitives. If there is no match, then the modified GS outputs the expected primitives.

On step 560 a response to the query is received. The response may comprise the number of primitives output by the GS. If the number is equal to the original number output by the VS, then there was no match to the required element and there is no need to take an action. However, if there is a match, then the element referred to in the configuration file had been recognized, and on step 564 the required action may be taken, for example adding another element to hide the specific element, adding text notifying that an option is unavailable, or the like.

It will be appreciated that step 560 and step 564 may not be taken immediately after step 556, which is why the double buffering is suggested. The response may be received immediately, if the game is blocked until an answer is received.

As mentioned above, in order to perform the pattern matching and per-pixel pattern matching options 200 and 204 of FIG. 2 on the GPU the following scheme may be used.

When a frame is done rendering, and a call is made to "Present" command, it may be assumed that the rendered frame is available in the form of a resource stored on the GPU memory. In order to perform the comparison, instead of copying the data to the system's RAM, pipeline 116 may be used, and specifically stage 432. The extracted pattern is loaded to the GPU in the form of a resource, such as a texture. If per-pixel pattern matching is used, the saved threshold matrix is also loaded, as a resource such as a texture.

Then, for each pattern it is required to check against the rendered frame, the following steps may be taken:

1. All resources may be loaded to the GPU. It may not be required to upload the rendered frame, as it already exists on the GPU.

2. An Occlusion Query may be issued, which questions how many pixels are rendered.

3. A quad, e.g. a four-edge polygon, may then be rendered using the X and Y offsets and the X and Y sizes received from extracting the pattern on stage 300. Since rendering uses triangles, the quad may be expressed as a combination of two triangles. The vertices of the quad may be rendered in screen-space coordinates, such that the rendered quad is located on top of the rendered frame, in the location of the searched pattern. The resources uploaded on Step 1 are set as a texture of the quad.

4. A proprietary Pixel Shader (PS) may then be used for performing the comparison. The PS may receive the RGB values of the rendered game frame pixel-by-pixel, the YUV value of the pattern, and if attached, the data of the threshold matrix. The RGB value may be converted to a YUV value by the PS.

The described comparison is performed on a per-pixel basis. If a pixel passes the test, it is outputted from the Pixel Shader onward. Otherwise, the pixel is discarded.

When the Draw call is completed, an answer for the Occlusion Query is awaited. It will be appreciated that it is not required to wait for a "Present" call since it may be that no such call is issued, and a response may be received after the Draw call is finished. The maximal number of outputted pixels is known as to be equal to the height*width of the pattern. If the percentage of the number of output pixels that passed a defined threshold, a positive match is received, otherwise, there is no match.

The disclosed methods may be used as described in a single-game environment, in which the CPU, the GPU and the display are co-located. However, in cloud gaming in which a remote processor executes one or a multiplicity of games and transmits the rendered audio and video to the respective user's display device, further problems may be encountered.

A first problem relates to the uncertainty about when a response to a query is provided. In single game systems, the response may be received immediately if rendering is blocked, but in multiple game systems, this may not be feasible.

For example, when querying about the number of primitives rendered, it may not be known whether the last draw command, for which the modified GS was activated, has been completed. Since speed is an issue, it is not desired to delay rendering until a relevant response is guaranteed.

In order to overcome this problem, a special automaton state, referred to as deferred state, is appended before each accepting state in the API Sequence automaton. Thus, the automaton does not proceed to an accepting state (in which an action is taken) until receiving a response to the query that a dummy primitive was indeed added, i.e., an action-requiring element was identified.

A second problem relates to the response to the query, being relevant only after all draw calls related to a frame are done. For example, consider an API sequence comprising three draw calls, the last of which requiring activation of the modified GS, and is therefore an accepting state, and in accordance with the solution to problem 1 above, also has a corresponding deferred state. Thus, the API sequence is as follows:

Draw call 1<signature 1>;
Draw call 2<signature 2>;
Draw call 3<signature 3>+<GS Detection>

Suppose a rendering stage for a specific frame comprises the following sequence:

Some draw calls;
Draw call 1;
Draw call 2;
Draw call 3; (*)
Some draw calls;
Draw call 1;
Draw call 2;
Draw call 3;
Present.

When the first draw call 3, marked by (*) is made, the automaton reaches a deferred state. However, it will be known whether the automaton is to assume an accepting state only after all calls are handled, since only the later call to draw call 3 may contain the action-requiring element.

In order to solve this problem, whenever an API Sequence automaton reaches a deferred state, it is duplicated, and the current frame continues with the new automaton, so that a multiplicity of these states may be handled without being lost. At the end of rendering the frame, a multiplicity of automatons may be present, but a response to the query will be available for each of them. Whether or not the action is to be taken depends on an OR function between all automatons having the same deferred state. If at least one of the automatons received a response that requires the action to be taken, the action is indeed to be taken.

A third problem relates to a situation common in cloud gaming in which a multiplicity of games may be executed by the same machine. This means that a multiplicity of command buffers from various games may be awaiting execution. In addition, since the Present API call made by the CPU is non-blocking, it may be unknown when the query response is ready.

This situation may be solved by assuming that when a frame rendered by one game is presented, its preceding frame is already done, or it is possible to wait for it to be done, therefore the response to the query related to the previous frame is ready.

The solution for this problem thus comprises using a double buffer mechanism, such that the API sequence automatons associated with one frame are in one buffer, and the API sequence automatons associated with the next frame are in another buffer. Whenever a new frame is rendered, the buffers are swapped, such that at each instance one buffer contains information related to the current frame and the other contains information related to the previous frame. The queries are handled in the same manner, in separate buffers.

Figure 6:
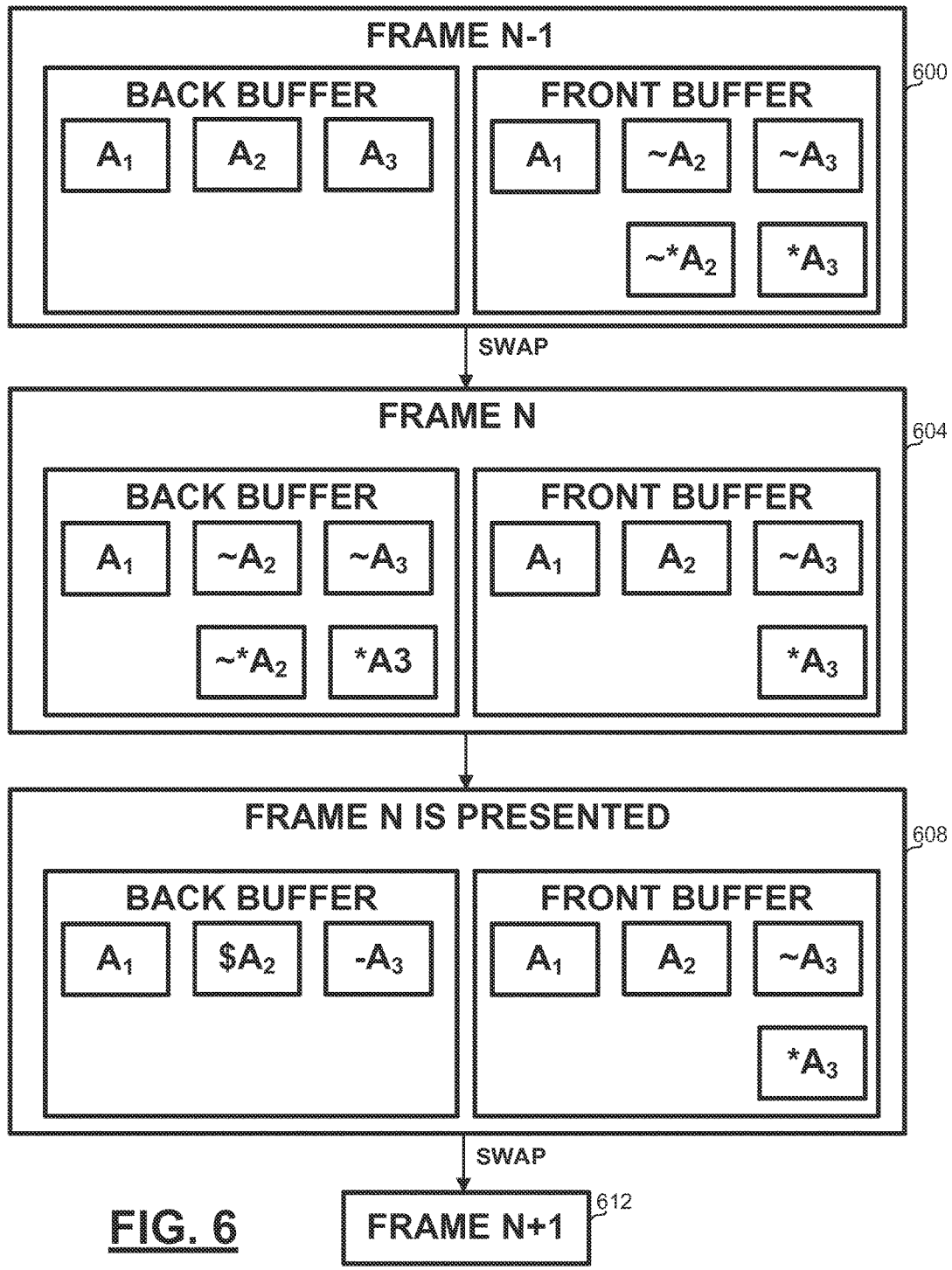
FIG. 6 shows an example for automaton management for the method of FIG. 5, in accordance with some exemplary embodiments of the disclosed subject matter.

Referring now to FIG. 6, showing an example demonstrating the combined solutions to the three problems.

The example refers to a frame comprising three API sequences, and uses the following annotations for $1<=i<=3$:

$A_i$ refers to an $i^{th}$ automaton associated with the $i^{th}$ API sequence, wherein the automaton is in an arbitrary state, not included in the states listed below;

$\sim A_i$ refers to the $i^{th}$ automaton when in a deferred state, i.e., the calls associated with the automaton were recognized and the automaton awaits a response to a query to determine whether it should move to an accepting state;

$*A_i$ refers to a duplicate of the $i^{th}$ automaton;

$\$A_i$ refers to the $i^{th}$ automaton being in an accepting state; and $-A_i$ refers to the $i^{th}$ automaton being in a rejecting state.

The example relates to frame n−1 and frame n. The buffers are named back buffer, which initially contains values related to the previous frame, e.g., frame n−2, and front buffer.

As shown in pane 600, the back buffer initially contains automatons $A_1$, $A_2$ and $A_3$ which have been stored there as part of frame n−2.

The front buffer stores $A_1$ which is not in any "special" state; $\sim A_2$ and $\sim A_3$ which are the corresponding automatons in deferred state, i.e., waiting for a response to the query; $\sim *A_2$ which is the $A_2$ automaton as duplicated since the sequence related to $A_2$ has occurred twice and is also in deferred state; and $*A_3$ which is the $A_3$ automaton as duplicated, since the sequence related to $A_3$ has occurred twice, but this automaton is not in any special state.

Once Frame n−1 is processed, the buffers are swapped, as shown in pane 604, and the back buffer stores the contents previously stored in the front buffer.

The front buffer now stores the automatons used in processing the $n^{th}$ frame, comprising $A_1$ and $A_2$ which are not in any "special" state; $\sim A_3$ which is the corresponding automaton in deferred state, i.e., waiting for a response; and $*A_3$ which is the $A_3$ automaton as duplicated, since the sequence related to $A_3$ has occurred twice, but this second automaton is not in any special state.

When frame n is presented, the response related to frame n−1 is received, and the buffer state is shown in pane 608, wherein the back buffer which relates to frame n−1 is updated. Suppose that an element requiring action is identified in sequence $A_2$ and not recognized in the sequence of $A_3$. Thus, in the back buffer $A_1$ remains in the same non-special state, $A_2$ assumes an accepting state and is thus $\$A_2$, and $A_3$ assumes a rejecting state and is thus $-A_3$. It will be appreciated that $A_2$ assumed an accepting state if the response related to at least one of the $A_2$ queries returned that the output of the GS comprised a larger number of primitives than its input, while $A_3$ assumed a rejecting state since both queries returned that the output of the GS comprised the same number of primitives as its input. $A_2$ assuming an accepting state implies that the action associated with an element of $A_2$, an element of a particular call in $A_2$, with the frame, or the like, is to be taken. The action may be any action such as adding a graphic element, ignoring an accepting state call in $A_2$, displaying a message, simulating a click, or the like.

The front buffer is not changed since there is no current information related to the elements of the $n^{th}$ frame.

When the next frame, being frame n+1 is to be processed, the back and front buffer are swapped again.

It will be appreciated that if the game already uses a GS in the specific draw call, the algorithm may be extended to use stream output (SO) stage 424 of FIG. 4. In most cases the GS is not used, but if required, the SO stage may be activated to render the draw call without changing the GS and to inspect the data by the CPU on the system's RAM.

The disclosed method provides for using increasingly resource-consuming or increasingly intrusive methods for identifying rendered elements that necessitate taking an action, such as hiding the element, adding another element or the like.

One of the methods is a per-pixel pattern matching, in which the pixels of the element to be recognized and its environment are assigned different significance threshold, wherein the more significant pixels are assigned lower threshold such that they may be vary less than other pixels.

Another method uses the pipeline of current GPU APIs to replace functions within the pipeline such as the geometry shader to detect the rendering of such elements based on comparing the function call characteristics to characteristics recognized during a preparation stage.

In order to overcome various synchronization problems, deferred states, duplicate automatons and double buffering may be introduced. It will be appreciated that these means are exemplary only, and other methodologies may be used problems arising from different environments such as cloud gaming.

Although some of the methods, and in particular the GPU API are intrusive, these methods are generally used only in specific scenes, and their activation may be avoided when not required, thus reducing intrusiveness.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method performed by a computerized device, comprising:
   receiving a modified version of a function, the function comprising a geometry shader function and being called during a rendering pipeline of a graphic processing unit (GPU) when rendering a frame, wherein the function is adapted to determine whether name and parameters provided to the function comply with data stored in association with the function;
   activating the modified version of the function; and
   subject to output of the modified version of the function indicating that input and the parameters provided to the modified version of the function match, adding to the frame an element to be rendered in response to matching of the input and the parameters, and taking action responsive to a query response being that the number of elements output by the modified version of the function exceeds a number of elements input into the modified version of the function by adding at least a second element;
   storing the frame in a memory device associated with the GPU; and
   outputting the frame including the element to be rendered to a display.

2. The computer-implemented method of claim 1 wherein the function is adapted to indicate in the function's output whether the input provided to the function complies with the provided parameters.

3. The computer-implemented method of claim 1 wherein responsive to matching of the input and parameters, output of the modified version of the function comprises a dummy element.

4. The computer-implemented method of claim 3, further comprising:
   issuing a query related to a number of elements output by the modified version of the function.

5. The computer-implemented method of claim 1 further comprising adding a deferred state to an automaton representing a series of calls leading to calling the modified version of the function, wherein the automaton assumes the deferred state until the query response is received.

6. The computer-implemented method of claim 1 further comprising generating a copy of an automaton representing a series of calls leading to calling the modified version of the function, responsive to a further instance of the series of calls occurring within the frame.

7. The computer-implemented method of claim 1 further comprising keeping a first automaton buffer for a first frame and a second automaton buffer for a second frame; and swapping the first automaton buffer and the second automaton buffer when a third frame is to be handled.

8. The computer-implemented method of claim 1 wherein the method is activated only in response to identifying that a corresponding indication is associated with the frame.

9. The computer-implemented method of claim 1 wherein added element hides an existing element of the frame.

* * * * *